May 6, 1924.
V. COLBY
SCROLL CUTTING MACHINE
Filed Jan. 19, 1921
1,492,554
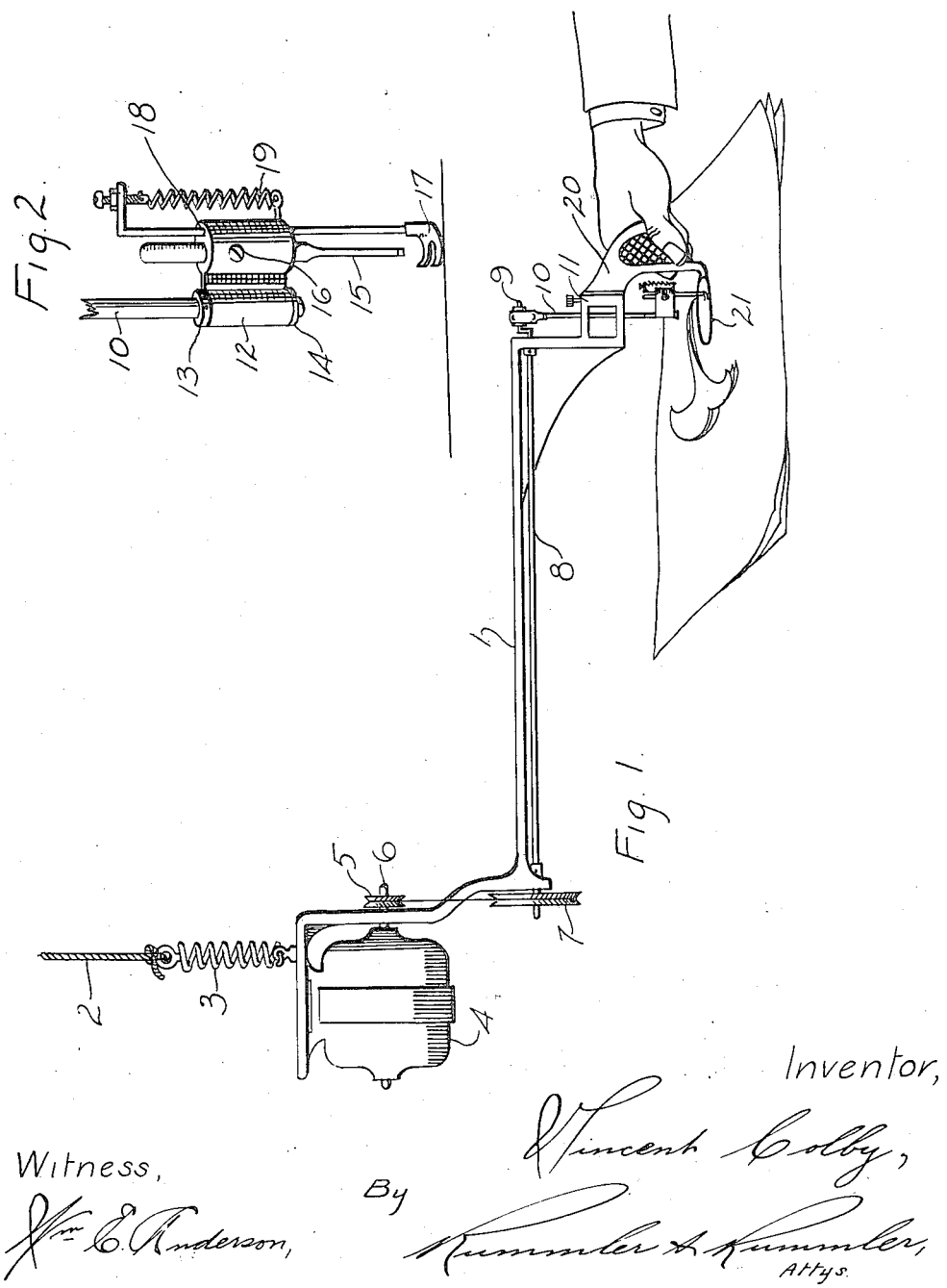
Witness,
Wm E. Anderson,
Inventor,
Vincent Colby,
By
Kummler & Kummler,
Attys.

Patented May 6, 1924.

1,492,554

UNITED STATES PATENT OFFICE.

VINCENT COLBY, OF CHICAGO, ILLINOIS, ASSIGNOR TO INTERNATIONAL REGISTER COMPANY, OF CHICAGO, ILLINOIS, A CORPORATION OF ILLINOIS.

SCROLL-CUTTING MACHINE.

Application filed January 19, 1921. Serial No. 438,497.

*To all whom it may concern:*

Be it known that I, VINCENT COLBY, a citizen of the United States of America, and a resident of Chicago, county of Cook, and State of Illinois, have invented certain new and useful Improvements in Scroll-Cutting Machines, of which the following is a specification.

This invention relates to scroll cutting machines adapted to work on sheet material such as paper, leather, wood or metal, and the objects of the invention are to provide a machine of this class adapted to travel while the material operated upon remains stationary; to provide an improved mounting for a reciprocating tool whereby the tool is caused to trail or follow its support as the support is shifted along the material operated upon; and to provide a device of this nature adapted to cut a fair curve in the general direction of movement of the machine irrespective of slight irregularities of movement of its support due to unsteady handling or guiding of the device.

In the accompanying drawings—

Fig. 1 shows in side elevation a scroll cutting machine constructed in accordance with this invention.

Fig. 2 is an enlarged detail of the reciprocating tool holder.

The device is adapted to work above a horizontal table top upon which the material to be operated upon is supported. The general arrangement of the machine consists of a frame which is resiliently hung from a bracket or a ceiling support. The frame may be swung in a horizontal plane around its support or shifted longitudinally from the point of attachment of the support to the ceiling or bracket, and the frame is counterbalanced by the arrangement of the motor with respect to the arm of the frame which carries the tool. The motor is belted to a crank shaft by means of which the tool holder and tool are rapidly reciprocated in bearings in the frame. The tool is mounted in the holder eccentric to the bearing for the holder in order that the tool will trail or follow the general motion of the frame as it is moved horizontally over the material operated upon.

The drawing shows a frame 1 which is suspended from some fixed support by the cord 2 and spring 3. The electric motor 4 which is mounted upon this frame carries a pulley 5 on its shaft 6. The pulley 5 is belted to a somewhat larger pulley 7 on a horizontal crank shaft 8 journaled in bearings in the frame 1. At the crank end 9 on shaft 8 is a rod 10 which is rapidly reciprocated in its bearings 11 by means of its crank connection with shaft 8. A tool holder 12 is journaled on the lower end of rod 10 and prevented from moving vertically thereon by the adjustable collars 13 and 14. The tool 15, which as represented in the drawing may have a chisel end, is secured in the tool holder by the set screw 16. A presser foot 17 is slidable in a vertical aperture 18 in the tool holder and is urged downward into engagement with the material to be cut, by the spring 19. A handle 20 is rigidly secured to the end of frame 1 and at its lower end is provided with a guide 21 for resting upon the work and holding it flat adjacent to the tool. This guide may be in the form of a ring encircling the presser foot 17.

In operating the device a tool is selected suitable for the nature of the material which is to be cut. When cutting wood a saw is used and the stroke of the rod 10 is increased over what is necessary, for instance in cutting leather, by a tool such as the tool 15 shown in the drawings. A sweeping motion imparted to handle 20 results in the tool following the general direction of motion but being insensitive to any slight transverse vibrations due to its pivotal mounting on rod 10. During the motion the tool is rapidly reciprocated and cuts a fair curve. In making inlaid leather several sheets of leather of different colors are cut at the same time so that portions of leather removed from one sheet may be inserted in the cutaway openings in another sheet of different color.

Although but one specific embodiment of this invention has been herein shown and described, it will be understood that numerous details of the construction shown may be altered or omitted without departing from the spirit of this invention as defined by the following claims.

I claim:

1. In a device of the class described, in combination, a work support, an element extending perpendicular to said support, means for reciprocating said element toward and away from said support, a laterally extending tool holder pivoted on said element, a tool in said holder engaging the work at a point offset laterally from the pivotal axis of said holder, and means for moving said element over the work without engaging said holder.

2. In combination, a pivoted tool holder, a tool in said holder positioned to engage the work at a point offset from the pivotal axis, power means for reciprocating said holder and tool toward and away from the work, and means for moving said tool holder over the work without interfering with free pivotal movement of said holder.

3. In combination, a pivoted tool holder, a tool in said holder positioned to engage the work at a point offset from the pivotal axis, power means for reciprocating said holder and tool toward and away from the work, means for moving said tool holder over the work without interfering with free pivotal movement of said holder, and means carried by said holder and having constant frictional engagement with the work adjacent the cutting point, to assist in turning the holder and making it follow the line of movement over the work.

Signed at Chicago this 15th day of January 1921.

VINCENT COLBY.